US008424843B2

(12) United States Patent
Ehrne

(10) Patent No.: US 8,424,843 B2
(45) Date of Patent: Apr. 23, 2013

(54) SHUTTLE VALVE HAVING TWO DRIVES

(75) Inventor: Florian Ehrne, Gisingen (AT)

(73) Assignee: VAT Holding AG (CH)

( * ) Notice: Subject to any disclaimer, the term of this patent is extended or adjusted under 35 U.S.C. 154(b) by 1378 days.

(21) Appl. No.: 11/879,500

(22) Filed: Jul. 18, 2007

(65) Prior Publication Data

US 2008/0017820 A1    Jan. 24, 2008

(30) Foreign Application Priority Data

Jul. 18, 2006  (CH) ...................................... 1158/06

(51) Int. Cl.
*F16K 1/16*    (2006.01)
(52) U.S. Cl.
USPC ............................. 251/301; 251/187; 251/193
(58) Field of Classification Search .................. 251/301, 251/302, 187, 193, 195, 196, 203, 204
See application file for complete search history.

(56) References Cited

U.S. PATENT DOCUMENTS

| | | | |
|---|---|---|---|
| 3,145,969 | A | 8/1964 | Von Zweck Tiemo |
| 3,343,562 | A * | 9/1967 | Combes ......................... 251/187 |
| 4,562,992 | A | 1/1986 | Sugisaki |
| 5,020,775 | A | 6/1991 | Iwasaki |
| 5,123,718 | A * | 6/1992 | Tyler ........................... 303/118.1 |
| 5,577,707 | A | 11/1996 | Brida |
| 6,089,537 | A | 7/2000 | Olmsted |
| 6,309,106 | B1 * | 10/2001 | Hooley .............................. 384/7 |
| 6,561,483 | B2 | 5/2003 | Nakagawa |
| 6,561,484 | B2 | 5/2003 | Nakagawa |
| 7,004,453 | B1 * | 2/2006 | Cheng ........................... 251/167 |
| 2005/0067603 | A1 | 3/2005 | Lucas et al. |

FOREIGN PATENT DOCUMENTS

| | | |
|---|---|---|
| DE | 1264191 B1 | 3/1968 |
| DE | 7731993 | 1/1978 |
| DE | 3447008 C2 | 7/1985 |
| JP | 54142774 | 11/1979 |
| JP | 60029014 | 2/1985 |
| JP | 62227532 | 10/1987 |
| JP | 63106468 | 5/1988 |

(Continued)

*Primary Examiner* — John K Fristoe, Jr.
*Assistant Examiner* — Andrew J Rost
(74) *Attorney, Agent, or Firm* — Muncy, Geissler, Olds & Lowe, PLLC

(57) ABSTRACT

The invention relates to a shuttle valve for interrupting a flow path (F), comprising a valve housing (1) having a valve seat (4) surrounding an opening (3) for the flow path (F). A valve disc (5) is arranged on a rotatably mounted shaft (6). By means of a drive unit (7), the valve disc (5) can be swiveled along a defined displacement curve (K1; K2; K3) from an opened position and leaving the flow path (F) unobstructed over the cross-section of the first opening (3) by a rotational movement about the pivot axis (8) of the shaft (6) and can be moved by a linear movement parallel to the pivot axis (8) in the direction of the valve seat (4) into a closed position so that the flow path (F) is sealed gas-tight by a sealing contact between the valve disc (5) and the valve seat (4). According to the invention, the drive unit (7) has a first drive (9*a*) for carrying out the rotational movement about the pivot axis (8) and a second drive (10*a*) for carrying out the linear movement parallel to the pivot axis (8). By means of a control unit (11), the first drive (9*a*) and the second drive (10*a*) can be actuated so that a variable displacement curve (K1; K2; K3) can be produced.

16 Claims, 5 Drawing Sheets

FOREIGN PATENT DOCUMENTS

| | | |
|---|---|---|
| JP | 11082458 | 3/1999 |
| JP | 11108243 | 4/1999 |
| JP | 2004225786 | 8/2004 |
| JP | 2006512548 | 4/2006 |

* cited by examiner

SHUTTLE VALVE HAVING TWO DRIVES

This non-provisional application claims priority under 35 U.S.C. §119 on Swiss Patent Application No. 01158/06, which was filed on Jul. 18, 2006, which is herein incorporated by reference in its entirety.

The invention relates to a shuttle valve for the substantially gas-tight interruption of a flow path by swiveling a valve disc over an opening and pressing the valve disc onto a valve seat surrounding the opening, according to the pre-characterizing clause of Claim 1. Such a valve is described in U.S. Pat. No. 6,089,537 (Olmsted).

Valves of the type mentioned at the outset are known in various embodiments from the prior art and are used in particular in the area of IC and semiconductor manufacture, which has to take place in a protected atmosphere as far as possible without the presence of contaminating particles. Shuttle valves serve, for example, for controlling or regulating the gas flow between a process chamber and a vacuum pump and are used, for example, as isolating or control valves. Isolating valves are used mainly for the complete opening and closing of a passage, whereas control valves are formed for establishing a certain flow cross-section or regulating or controlling a certain flow rate in that the closure disc can in particular assume any desired fixed intermediate position.

In the case of a shuttle valve, a valve disc which as a rule is round is rotated in a first step over an opening which as a rule is likewise round, from a position leaving the opening unobstructed into an intermediate position covering the opening. In this intermediate position, the valve disc of the shuttle valve is in a position opposite the valve seat surrounding the opening at a distance away from said valve seat. In a second step, the distance between the valve disc and the valve seat is reduced so that the valve disc and the valve seat are pressed uniformly onto one another and the opening is closed substantially gas-tight. This second movement is effected, for example, in a perpendicular direction to the valve seat by means of link motion and/or spring force. As a result of the closing process which takes place in two steps, the sealing ring between the valve disc and the valve seat is subjected to scarcely any shear forces which would destroy the sealing ring, since the movement of the valve disc in the second step takes place substantially linearly perpendicularly to the valve seat.

The prior art discloses various drive systems for achieving this combination of a rotational movement of the valve disc in the case of the shuttle valve, parallel over the opening, and a substantially translational movement perpendicular to the opening, for example in U.S. Pat. No. 6,089,537 (Olmsted).

The pressing of the valve disc onto the valve seat must take place in such a way that both the required gas tightness within the total pressure range is ensured and damage to the sealing medium in particular the sealing ring in the form of an O-ring, by excessive compressive stress is avoided. For this purpose, some known valves provide contact pressure regulation of the valve disc as a function of the pressure difference prevailing between the two valve disc sides. In order to achieve the required gas tightness, optionally both for excess pressure and for reduced pressure, some known shuttle valves or gate valves provide, in addition or alternatively to the second movement step, a valve ring which can be displaced perpendicularly to the valve disc, surrounds the opening and is pressed onto the valve disc for gas-tight closing of the valve. Such valves having valve rings actively displaceable relative to the valve disc are disclosed, for example, in DE 1 264 191 B1, DE 34 47 008 C2, U.S. Pat. No. 3,145,969 (von Zweck) and DE 77 31 993 U. U.S. Pat. No. 5,577,707 (Brida) describes a shuttle valve comprising a valve housing having an opening, and a valve disc which can be swiveled parallel over the opening and is intended for controlling a flow through the opening. A valve ring which surrounds the opening can be actively moved perpendicularly in the direction of the valve disc by means of a plurality of springs and pneumatic cylinders. A possible further development of this shuttle valve is proposed in US 2005/0067603 A1 (Lucas et al.). U.S. Pat. No. 6,561,483 (Nakagawa) and U.S. Pat. No. 6,561,484 (Nakagawa et al.) disclose vacuum valves in various embodiments which comprise a two-part valve disc. A first disc section has an opening. The second disc section is connected to the first disc section by means of an extendable body. An actuator is arranged between the first and the second disc section so that the two disc sections can be moved actively towards one another and away from one another.

U.S. Pat. No. 6,089,537 (Olmsted) describes a shuttle valve having a drive system for achieving the combination of a rotational movement of the valve disc parallel over the opening and an approximately translational movement perpendicular to the opening. The drive system has a single drive which is coupled to the shaft of the valve disc for swiveling the valve disc over the opening. The shaft is mounted not only radially but also linearly. A link in the form of a slot-like guide track which extends around the shaft is mounted on the shaft. A cam mechanism which is connected to the housing of the drive system engages the guide track. The guide track is designed so that—starting from the completely open position of the closure disc—the rotational movement of the shaft brought about by the drive initially affects a purely rotational swivel movement of the valve disc parallel over the opening. Shortly before reaching the position in which the valve disc is swiveled completely over the opening, the guide track of the link executes an additional translational movement of the shaft along its axis so that the perpendicular distance between the valve disc and the opening up to pressing of the closure disc approximately perpendicularly onto the opening is reduced. By means of the link, the rotational movement brought about by the drive is thus additionally deflected into a translational movement of the valve disc perpendicular to the opening, with the result that the single drive is sufficient for the rotational and translational movement. A disadvantage of this drive system is the fixed coupling of the rotational with the translational movement. Precise regulation of the flow in the virtually closed state of the valve is scarcely possible since the perpendicular distance between the opening and the closure disc cannot be individually adjusted. The exactly perpendicular placing of the valve disc on the valve seat is not possible or possible only to a limited extent so that shear forces occur on pressing the seal onto the valve seat and the seal is thus exposed to increased wear. Since the displacement curve of the displacement path is predetermined and variation of the displacement curve of the finally installed valve is not possible, the valve is suitable either for fast displacement in which the valve is opened or closed within a very short time or for precise displacement with a precisely controllable flow, since both displacement strategies require different displacement curves in each case. For use as a rapidly displaceable isolation valve on the one hand and a precisely adjustable control valve on the other hand, such a shuttle valve is only of limited suitability.

U.S. Pat. No. 5,020,775 (Iwasaki et al.) discloses an isolation valve having a rotatably mounted shaft, a lever for rotating the shaft, a lifting cylinder arranged in the geometrical axis of the shaft at one end and intended for the axial to and fro movement of the shaft by means of a reciprocal movement, an arm fixed at the other end of the shaft and a valve disc arranged on the arm and intended for opening and closing a round opening. The lever to be operated manually executes the reciprocal movement together with the shaft. The isolation valve is closed by the operator first operating the lever of the shaft and thus swiveling the valve disc completely over the opening. In a second step, the valve disc is moved perpendicularly in the direction of the opening by means of the lifting cylinder and is pressed onto a valve seat surrounding the opening, the lever and the shaft likewise executing the reciprocal movement. The isolation valve to be operated in part manually is unsuitable for regulating a flow, both owing to the sealing technology and owing to the drive technology, since neither the translational movement by means of the lifting cylinder nor the rotational movement by means of the lever to be operated manually can be executed and adjusted precisely.

It is therefore an object of the invention to provide a shuttle valve of the type mentioned at the outset which is suitable both for precise regulation of flow and for rapid complete opening and closing and is distinguished by little wear, simple design and good maintainability.

This object is achieved by realising the characterizing features of the independent Claim. Features which further develop the invention in an alternative or advantageous manner are described in the dependent patent Claims.

The shuttle valve according to the invention for the substantially gas-tight interruption of a flow path comprises a valve housing having a wall which is formed in general by a valve housing section and which has an opening for the flow path. The shuttle valve is used between two regions, for example, pipeline sections, chambers, assemblies, pumps or the atmosphere, which are detachably connected to one another directly or indirectly via the shuttle valve in a gas-tight manner. The interruptible path connecting these two regions and leading through the shuttle valve is the flow path whose cross-section in the region of the shuttle valve is variable from zero to, for example, the total opening cross-section through the shuttle valve. Shuttle valves generally have a circular flat opening or preferably a plurality of openings, in particular two openings, which are parallel to one another and a distance apart. A valve seat which encloses the opening is present around the opening. Furthermore, the vacuum valve comprises a valve disc which is arranged in particular via an arm on a rotatably mounted shaft. Various one-part and multipart embodiments of valve discs are known from the prior art. The valve disc has, for example, a cross-section which corresponds to the opening but is somewhat larger so that it can cover and close the complete opening when the valve disc is pressed with its closure surface onto the valve seat surrounding the opening. For gas-tight sealing, a sealing medium, in particular a sealing ring, may be arranged on the valve seat of the valve housing and/or on the closure surface of the closure disc. The valve seat is to be understood in general as meaning that surface around the opening by means of which the closure surface of the valve disc can be brought into contact for gas-tight sealing of the opening. For displacement of the valve disc, a drive unit is arranged on the valve housing. The valve housing is to be understood generally as meaning that section of the shuttle valve relative to which the valve disc is displaceable. Thus, the housing and support elements of the drive unit which are arranged on the actual valve housing are also to be understood as a component of the valve housing, regardless of whether they can be separated from the valve housing or the valve housing thus defined is formed as one part or a plurality of parts.

By means of the drive unit, the valve disc can be moved along a defined displacement curve from an opened position, in which the flow path is essentially or partly unobstructed, into a closed position so that the flow path is interrupted in a gas-tight manner by sealing contact between the valve disc and the valve seat. The movement comprises a rotational movement about the pivot axis of the shaft, wherein the valve disc is swiveled over the cross-section of the first opening, and a linear movement parallel to the pivot axis in the direction towards the valve seat. The rotational movement and the linear movement coincide, overlap or are consecutive. Of course, a reversal of the sequence is possible for opening the shuttle valve again.

In other words, by means of the drive unit, the valve disc can be moved along a defined displacement curve from an opened position leaving the flow path essentially or partly unobstructed over the cross-section of the first opening into a closed position, in which the flow path is sealed gas-tight by a sealing contact between the valve disc and the valve seat. This movement between the opened position and the closed position is achieved by swiveling the valve disc from the opened position by a rotational movement about the pivot axis of the shaft and by moving the valve disc by a coincident, overlapping or sequential linear movement parallel to the pivot axis in the direction of the valve seat into the closed position.

According to the invention, the drive unit has a first drive for carrying out the rotational movement about the pivot axis and a second drive for carrying out the linear movement parallel to the pivot axis and perpendicular to the valve seat. Furthermore, the shuttle valve has a control unit by means of which the first drive and the second drive can be actuated so that a variable displacement curve can be brought about. The control unit either can be arranged directly on the shuttle valve and can be, for example, a component of the drive unit or can be present at a location a distance away, for example as a stored-program control in a switch cabinet or as a computer program product of a PC equipped with appropriate ports. Between the control unit and the two drives, there is a signal link which is at least unidirectional and which is such that two drives can be actuated separately from one another. The signal link can be affected by means of a cable or wirelessly.

The drives may be in the form of rotary and/or linear drives and are coupled directly or indirectly, in particular via gears, shafts, couplings, belts, chains, etc., to the valve disc for the rotational and linear movement thereof.

The displacement curve is to be understood as meaning the travel path of the valve disc based on the pivot angle about the pivot axis and the linear path along the pivot axis, or the perpendicular distance between the valve disc and the valve seat. Owing to the rotational swivel movement of the valve disc which takes place in two dimensions and the linear reciprocal movement taking place in the third dimension, the real displacement curve of the shuttle valve is three-dimensional, but, for simplification, the displacement curve is to be understood below as meaning a two-dimensional curve whose components are composed of the rotational swivel movement of the first drive and the linear reciprocating movement of the second drive. Of course, it is also possible in the scope of the invention to include any desired number of further components in the multidimensional displacement curve, for example by means of an additional linear movement of the arm to which the valve disc is fixed, which movement is effected by means of a third drive. The control unit is designed so that the displacement curve is not inevitably fixed, as in the case of a mechanical link motion, but can be varied by virtue of the fact that the linear movement of the closure disc parallel to the pivot axis and perpendicular to the valve seat is not inevitably firmly coupled to the rotational movement of the valve disc about the pivot axis, and vice versa. The two drives are designed so that the movement of the valve disc along the displacement curve specified by the control unit can be actually effected so that a movement of the valve disc along the defined displacement curve is possible. In particular, stepper motors are suitable for this purpose. The use of other drives, for example regulated electric motors or pneumatic drives, is likewise possible provided that they are sufficiently precisely actuatable by the control unit so that a reproducible movement sequence of the valve disc along the defined displacement curve is possible with sufficiently great accuracy.

An advantage of the invention is the possibility of choosing different displacement curves in particular as a function of the mode of operation of the shuttle valve, the displacement direction, the displacement velocity, the flow-through medium, the temperature thereof, the pressure difference at the shuttle valve, the valve disc used and the wear thereof. The displacement curves and the dependence thereof on any desired variables can be programmed, for example, by the user of the shuttle valve by means of the control unit, with the result that a versatile shuttle valve is provided.

In an embodiment of the invention, the control unit is formed in such a way that the shape of the displacement curve is linked to the displacement velocity of the valve disc. For example, the linear movement of the second drive is linked to the rotational velocity of movement. In the case of rapid closing of the shuttle valve, the second drive is initiated for effecting the linear movement of the closure disc parallel to the pivot axis at a time as early as when the rotational movement over the opening, produced at high velocity by the first drive, is not yet complete, the two movements being synchronized in such a way that the closure disc has reached its completely swiveled-in position over the opening immediately before touching the valve seat. Immediately before the closure disc rests on the valve seat, the rotational movement is thus complete so that, instead of a parallel relative movement, exclusively a perpendicular relative movement takes place on initial contact between the closure side of the closure disc and the valve seat. Shear forces which act on the sealing surfaces and increase their wear are avoided thereby. On opening of the valve, a corresponding procedure can be adopted. The mode of operation described is suitable, for example, for using the shuttle valve as an isolation valve which is to be changed as rapidly as possible between a completely opened and a completely closed state.

In another mode of operation, for example one in which flow or pressure is regulated, the closure disc, for metered closing of the shuttle valve, is first swiveled slowly over the opening by means of a pure rotational movement via the first drive about the pivot axis until said opening is substantially completely overlapped by the valve disc. Owing to the perpendicular distance between the valve disc and the valve seat, the flow path is not yet completely closed. By initiating the linear movement of the closure disc via the second drive and hence reducing the perpendicular distance, it is possible to reduce the opening cross-section in a highly accurate metered manner. By varying the perpendicular distance, more precise adjustment of the opening cross-section is possible than by means of swiveling over the opening. Thus, this mode of operation is suitable, for example, for using the shuttle valve as a highly accurate control valve.

In addition, it is possible to make the linear movement dependent on the direction of the rotational movement and to choose, for example, a displacement curve suitable for slow and metered closing of the shuttle valve and a displacement curve suitable for rapid opening of the shuttle valve. Any desired combination of other modes of operation can be realised.

In a further development of the invention, a slide mounted so as to be linearly displaceable parallel to the pivot axis relative to the valve housing is provided in the drive unit of the shuttle valve. This slide can be moved by means of the second drive for carrying out the linear movement and hence for adjusting the perpendicular distance of the valve disc to the valve seat. The shaft on which the valve disc is arranged, in particular via the arm, is mounted on the slide so as to be rotatable about the pivot axis. A slide is to be understood in general as meaning an element mounted so as to be linearly displaceable parallel to the pivot axis relative to the valve housing, in particular a plate, a bearing block or another body. The linear mounting takes place in one embodiment by means of at least one, preferably two or three, bearing column(s) extending parallel to the pivot axis. The bearing column is enclosed by at least one linear bearing, for example a high-precision linear roller bearing or a sliding bearing bush, so that the slide is mounted so as to be movable along the bearing column with high precision. The first drive is arranged either directly on the slide for effecting the rotational movement of the shaft or decoupled from the slide and coupled directly or indirectly to the valve housing. In the latter case, a coupling is provided between the first drive and the shaft, which coupling is arranged and formed in such a way that the axial offset caused by the linear movement of the slide between the shaft and the first drive is compensated. Such couplings are disclosed in various embodiments in the prior art and are, for example, in the form of a claw coupling. The first drive can be formed by a first electric motor, in particular a first stepper motor, by means of which the shaft can be driven directly or indirectly for carrying out the rotational movement. Alternatively, the first drive can be in the form of a first pneumatic drive. The second drive can be a second electric motor, in particular a second stepper motor, by means of which the shaft, or the slide by means of a threaded spindle, is directly or indirectly axially displaceable for carrying out the linear movement. Alternatively, the second drive is a second pneumatic drive. The drives may be linear or rotary drives for direct or indirect driving, in particular via gears, eccentric mechanisms or lever mechanisms. It is also possible to use other types of drives, for example hydraulic drives.

By using the linearly mounted slide, highly precise linear mounting of the valve disc and hence highly accurate adjustment of the opening cross-section are possible so that this shuttle valve is outstandingly suitable for precise regulation tasks. Furthermore, a simple design of the drive unit can be realised, which considerably facilitates the maintainability of the shuttle valve and of the components thereof.

The shuttle valve according to the invention is described in more detail below, purely by way of example, with reference to specific working examples shown schematically in the drawings.

Specifically,

Figure 1A:
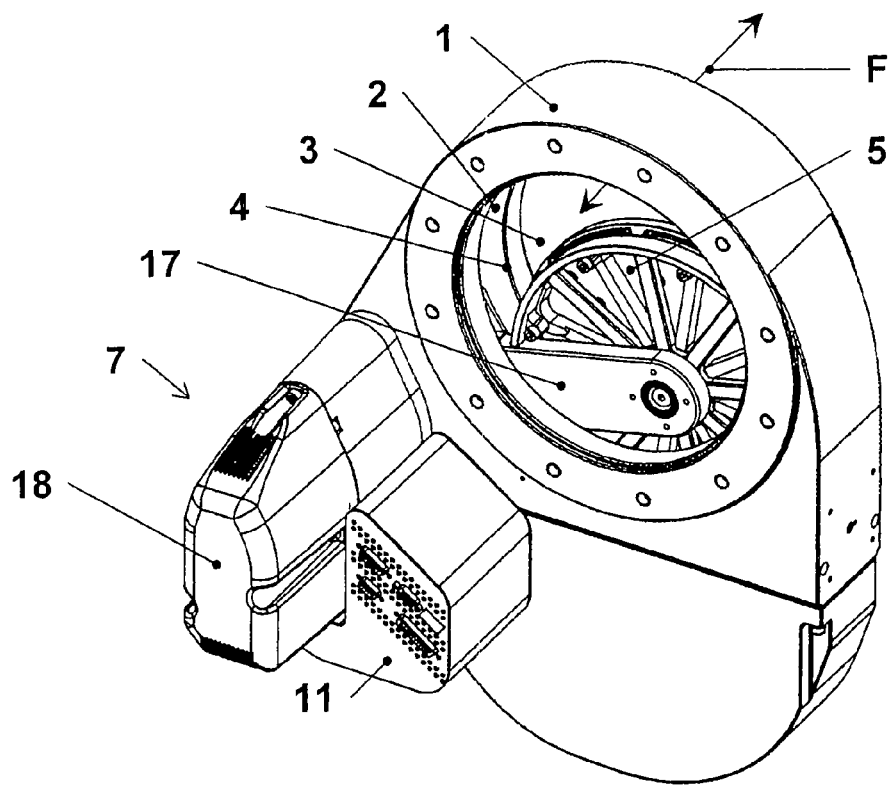
FIG. 1a shows a shuttle valve having two drives with mounted drive cover.
Figure 1B:
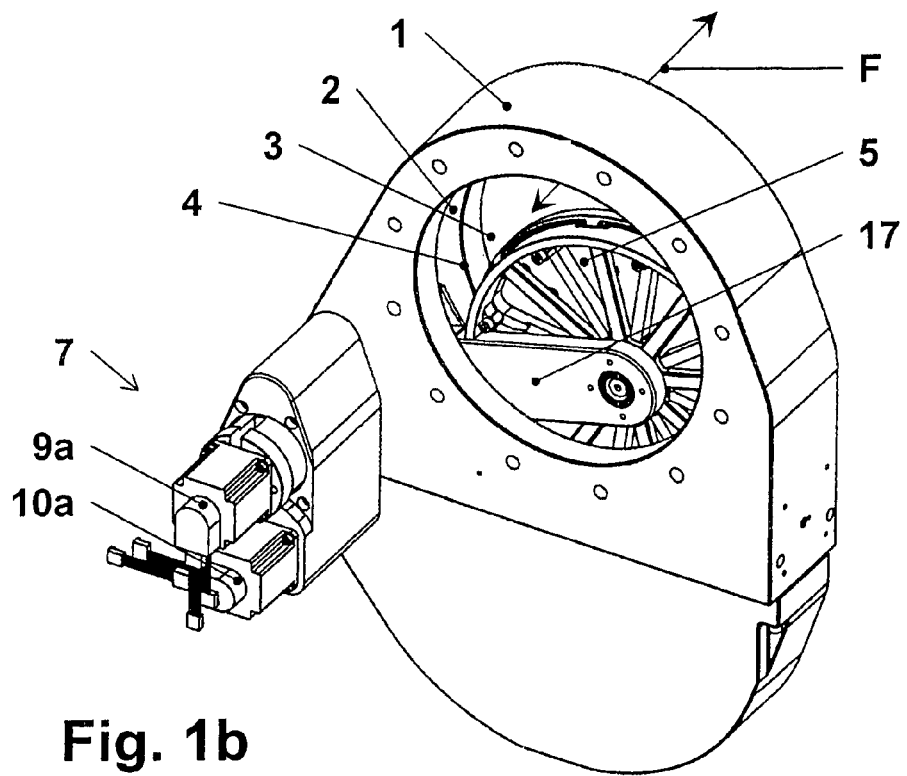
FIG. 1b shows the shuttle valve having two drives without drive cover.
Figure 2:
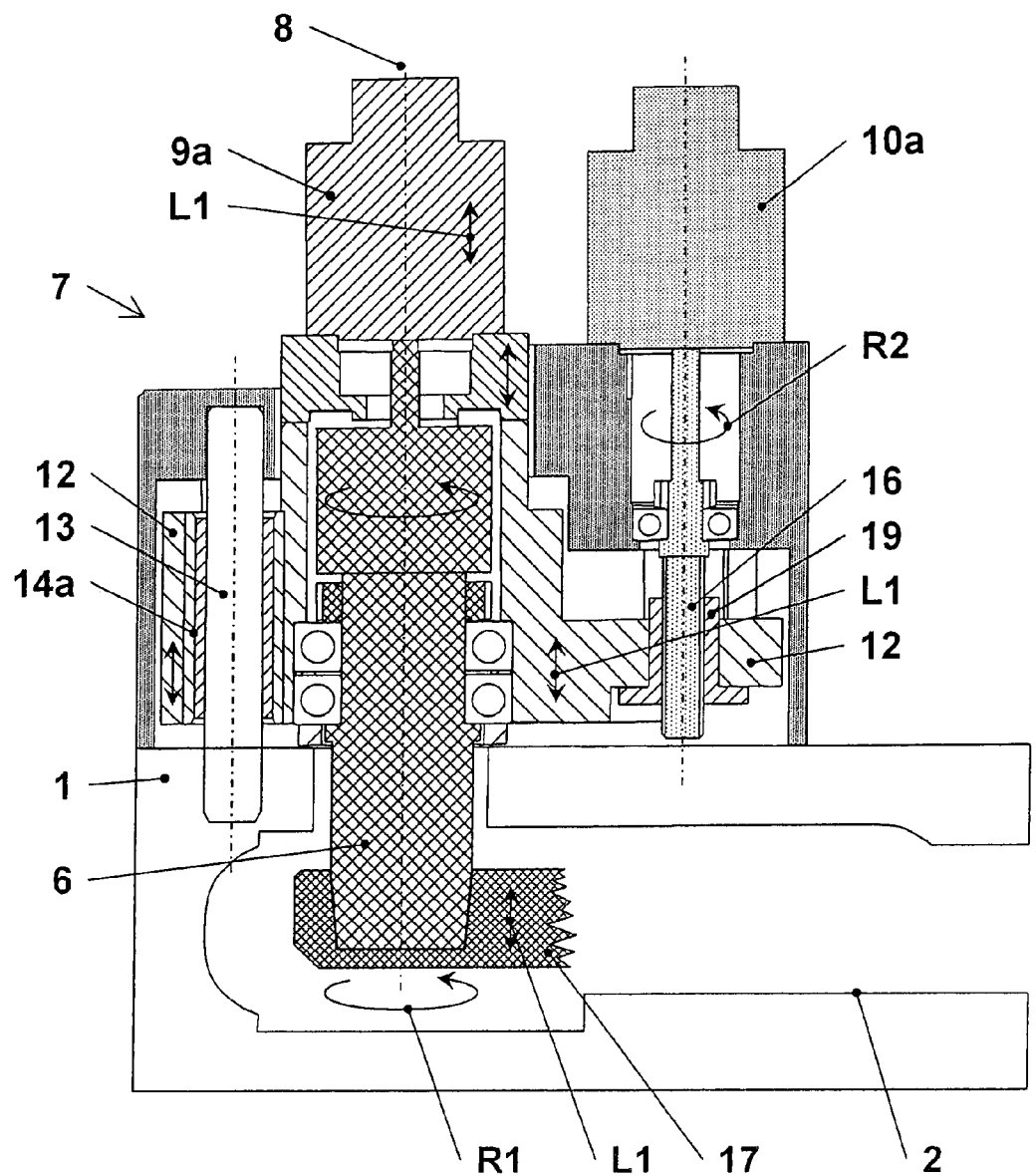
FIG. 2 shows a cross-section through the drive unit of the shuttle valve with a first drive arranged on the slide.

FIGS. 1a, 1b and 2 show substantially a single embodiment of the invention in different views, states and degrees of detail, and it is for this reason that these figures are described together in some cases. FIGS. 2 to 6 each show an alternative embodiment of the drive unit. Since in some cases common reference numerals are used for the figures and the embodiments have in some cases common features reference numerals already explained beforehand will in parts not be discussed again.

FIGS. 1a and 1b show a shuttle valve comprising a valve housing 1, which has, in a wall 2, a round opening 3 for a flow path F of a gas, illustrated by an arrow. The opening 3 is surrounded by a valve seat 4 which is formed by that edge section of the wall 2 which points towards the interior of the valve housing 1. Inside the valve housing 1, a flat multi-part valve disc 5 is arranged so as to be pivotable over the opening 3 by means of an arm 17. The shuttle valve has a drive unit 7 by means of which the valve disc 5 can be swiveled over the opening and pressed onto the valve seat 4. The drive unit 7 is closed by a drive cover 18 in FIG. 1a. An electronic control unit 11 having numerous electrical interfaces is arranged on the drive unit 7. FIG. 1b on the other hand shows the drive unit 7 without the drive cover 18 and the control unit 11, so that the first drive 9a in the form of a first stepper motor and a second drive 10a in the form of a second stepper motor are visible.

FIG. 2 shows a cross-section through the drive unit 7 and the two stepper motors 9a and 10a. The drive unit 7 comprises a slide 12 on which a shaft 6 is rotatably mounted. The arm 17, which connects the shaft 6 to the valve disc 5, is arranged non-rotatably on the shaft 6. By rotation of the shaft 6 about its axis, the pivot axis 8, the valve disc 5 can be swiveled to and fro over the opening 3. For effecting the rotational movement R1 of the shaft 6 by direct driving of the shaft 6, the first stepper motor 9a is arranged on the slide 12.

The slide 12 is mounted so as to be linearly displaceable relative to the valve housing 1 parallel to the pivot axis 8 of the shaft 6 by virtue of the fact that two bearing columns 13 extending parallel to the pivot axis 8 and fixed on the valve housing 1 are provided. In the cross-section shown, only one of the two bearing columns 13 is recognisable. The slide 12 is guided linearly with high precision along the bearing columns 13 by the use of linear bearings which are in the form of high-precision linear roller bearings 14a. The second stepper motor 10a for the linear movement L1 of the slide is mounted on a section of the drive unit 7, which section is coordinated with the valve housing 1. By means of the second stepper motor 10a, the slide can be moved linearly, parallel to the pivot axis 8 and along the bearing columns 13. For this purpose, the shaft of the second stepper motor 10a is in the form of a threaded spindle 16, which engages a threaded bush 19 arranged on the slide 12 and displaces the slide 12 linearly by the rotation R2, as illustrated by the arrows L1. In an alternative embodiment, the second stepper motor 10a is present on the slide 12, and the threaded bush 19 on the valve housing 1.

By means of the first stepper motor 9a, it is possible to swivel the closure disc 5 from an opened position leaving the flow path F unobstructed over the cross-section of the first opening 3 by a rotational movement R1 about the pivot axis 8 of the shaft 6 brought about by the first stepper motor 9a. By a linear movement L1 of the slide 12 with the shaft 6 and the valve disc 5 parallel to the pivot axis 8 in the direction of the valve seat 4, which movement is effected by means of the second stepper motor 10a, the valve disc 5 can be moved into a closed position so that the flow path F can be sealed gas-tight by a sealing contact between the valve disc 5 and the valve seat 4 on the wall 2. By way of illustration, the three groups of movement of the shuttle valve are characterized by different types of shading in FIG. 2. The parts coupled to the valve housing 1, namely the housing sections of the drive unit b7, the second stepper motor 10a, the spindle 16 thereof and the bearing columns 13, are dotted or not filled. Parts which execute the linear movement L1 which is indicated by means of the vertical arrows, is effected by the second stepper motor 10a and takes place parallel to the pivot axis 8, namely the slide 12, the linear roller bearings 14a and the first stepper motor 9a, are shown shaded. The cross-hatched parts, namely the shaft 6 and the arm 17, on which the valve disc 5 is mounted, execute both the linear movement L1 of the slide 12 and the rotational movement R2 brought about by the second stepper motor 9a.

Figure 7:
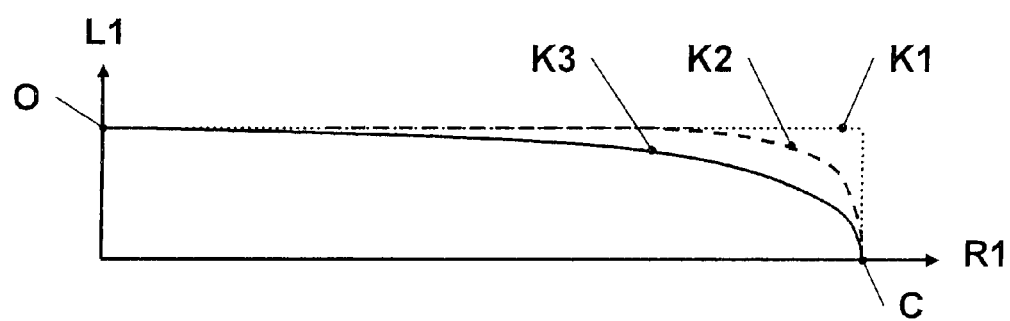
FIG. 7 shows three different defined displacement curves of the valve disc.

The control unit 11 shown in FIG. 1a has a signal connection to the two stepper motors 9a and 10a. The first stepper motor 9a and the second stepper motor 10a can be actuated separately by the control unit 11 in such a way that a variable displacement curve K1, K2 or K3 (cf. FIG. 7) along which the valve disc 5 can be moved from the opened position O into the closed position C, and vice versa, can be produced. FIG. 7 shows three displacement curves K1, K2 and K3 schematically, the x axis representing the rotational movement sequence R1 about the pivot axis 8, brought about by the first stepper motor 9a, and the y axis representing the linear movement sequence L1 parallel to the pivot axis 8, brought about by the second stepper motor 10a. Starting from the completely opened position O of the shuttle valve, first exclusively the first stepper motor 9a is actuated so that the valve disc 5 swivels over the opening 3. According to the first displacement curve K1, this movement is executed until the valve disc 5 completely covers the opening, the perpendicular distance between the valve disc 5 and the valve seat 4 remaining constant since the second stepper motor is non-operational. Only after the end of the rotational movement R1 and stoppage of the first stepper motor 9a is the second stepper motor 10b activated to produce the linear movement L1 and hence to reduce the perpendicular distance between the closure disc 5 and the valve seat 4 until the closure disc 5 comes to rest on the valve seat 4 and the shuttle valve is in the completely closed position C. An advantage of this trivial displacement curve K1 is the precise controllability of the opening cross-section and the small degree of wear of the sealing surfaces between the closure disc 5 and the valve seat 4, since shearing parallel to the valve seat 4 does not occur. A disadvantage of this displacement curve K1 is the relatively long displacement path and the associated longer displacement time between the open position O and the closed position C. In the case of the displacement curves K2 and K3, the linear movement L1 already begins in a position of the valve disc 5 in which the latter is only partly swiveled over the cross-section of the opening 3, the valve disc 5, however, having ended its swivel movement due to stoppage of the first stepper motor 9a shortly before the initial contact with the valve seat 4, so that shearing at the sealing surfaces is substantially avoided. The displacement curve K3 is thus distinguished by a substantially shorter displacement path and a shorter displacement time. Of course, the sequence described here from the opened to the closed state of the shuttle valve can be reversed and can be varied as desired. The examples explained here serve merely by way of illustration. Any desired other shapes of displacement curves can be realised, provided that the occurrence of excessive shear forces which damage the sealing surfaces is avoided.

Figure 3:
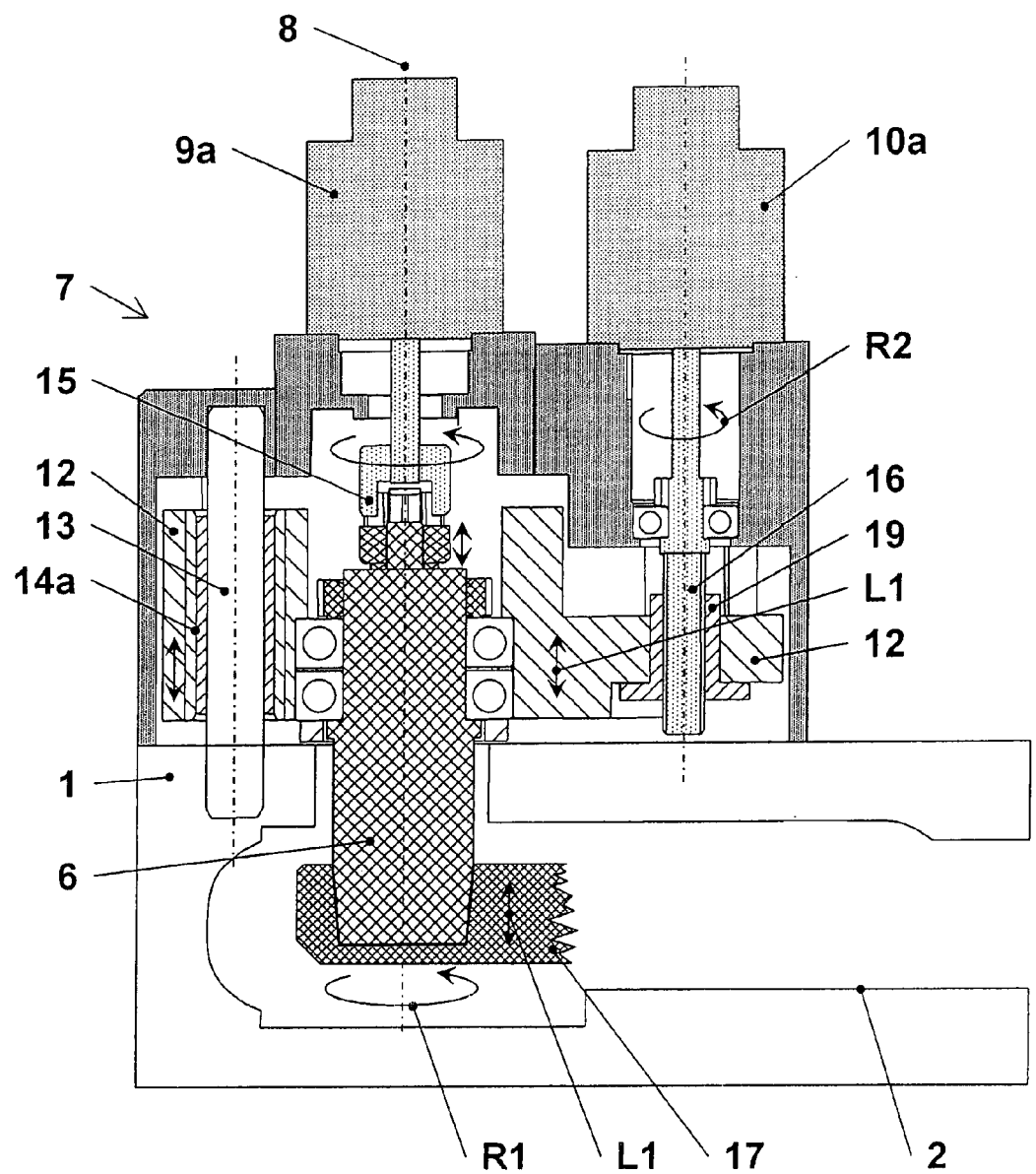
FIG. 3 shows a cross-section through the drive unit of a first alternative embodiment with a first drive arranged indirectly on the valve housing.

FIG. 3 shows a cross-section through the drive unit 7 of a first alternative embodiment of a drive unit 7 having a first drive 9a arranged indirectly on the valve housing 1. Here, the first drive 9a is not arranged on the slide 12, as in the working example from FIG. 2, but is decoupled from the slide 12 and arranged on a housing section of the drive unit 7, which section is coordinated with the valve housing 1. The first drive 9a therefore does not execute the linear movement L1 of the slide 12 and of the shaft 6. In order nevertheless to permit driving of the shaft 6, a coupling 15 is provided between the first drive 9a and the shaft 6, which coupling is arranged and formed in such a way that the axial offset between the shaft 6 and the shaft of the fixed first drive 9a, which offset is brought about by the linear movement L1 of the slide 12, can be compensated. The coupling 15 is in the form of a claw coupling. The remaining design corresponds to the drive unit 7 explained in FIG. 2 and will therefore not be discussed in more detail.

Figure 4:
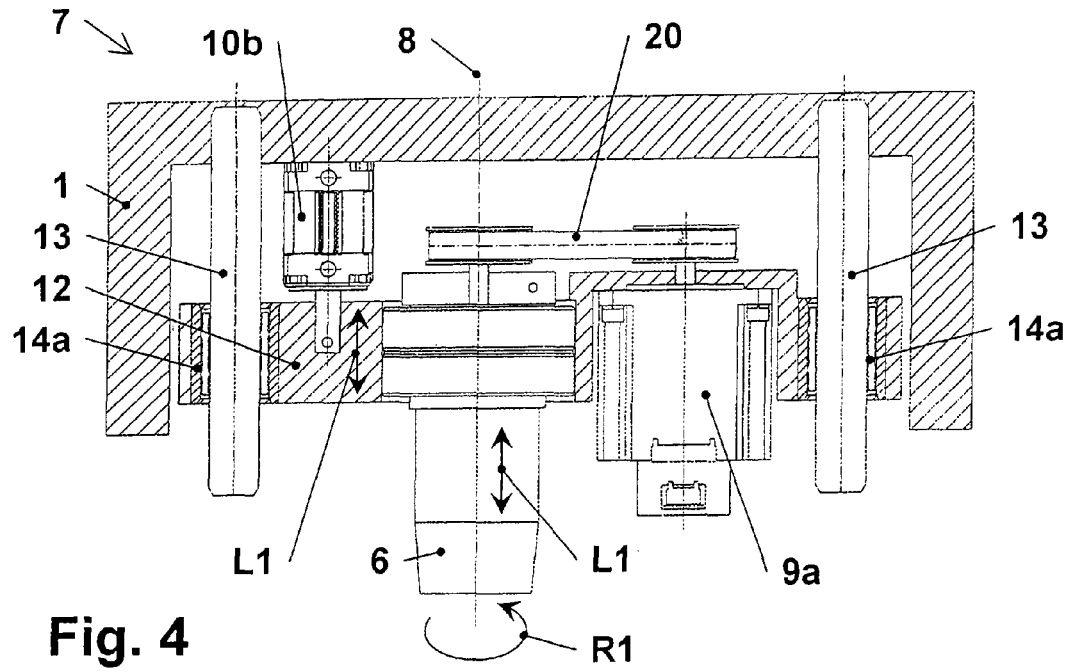
FIG. 4 shows a cross-section through the drive unit of a second alternative embodiment of the shuttle valve with a belt drive.

FIG. 4 shows a cross-section through the drive unit 7 of a second alternative embodiment of the shuttle valve having a belt drive 20. The slide 12 is mounted by means of two bearing columns 13 and two linear roller bearings 14 so as to be linearly displaceable relative to the valve housing 1, a second drive in the form of a second pneumatic drive 10b and intended for producing a linear movement L1 of the slide 12 being arranged between the slide 12 and the valve housing 1. The second pneumatic drive 10b is, for example, a high-precision pneumatic cylinder with distance regulation. A shaft 6 is mounted on the slide 12 so as to be rotatable about the pivot axis 8. The pivot axis 8 is parallel to the bearing columns 13. A first drive mounted parallel to the shaft 6 on the slide 12 and in the form of first stepper motor 9a is connected by means of a belt drive 20 to the shaft 6 and drives the latter. By appropriate actuation of the first stepper motor 9a and of the second pneumatic drive 10a, a rotational movement R1 about the pivot axis 8 or a linear movement L1 parallel to the pivot axis 8 of the shaft 6 can be produced so that the above-described movement sequence of the valve disc 5 mounted via the arm 17 on the shaft 6 can be realised.

Figure 5:
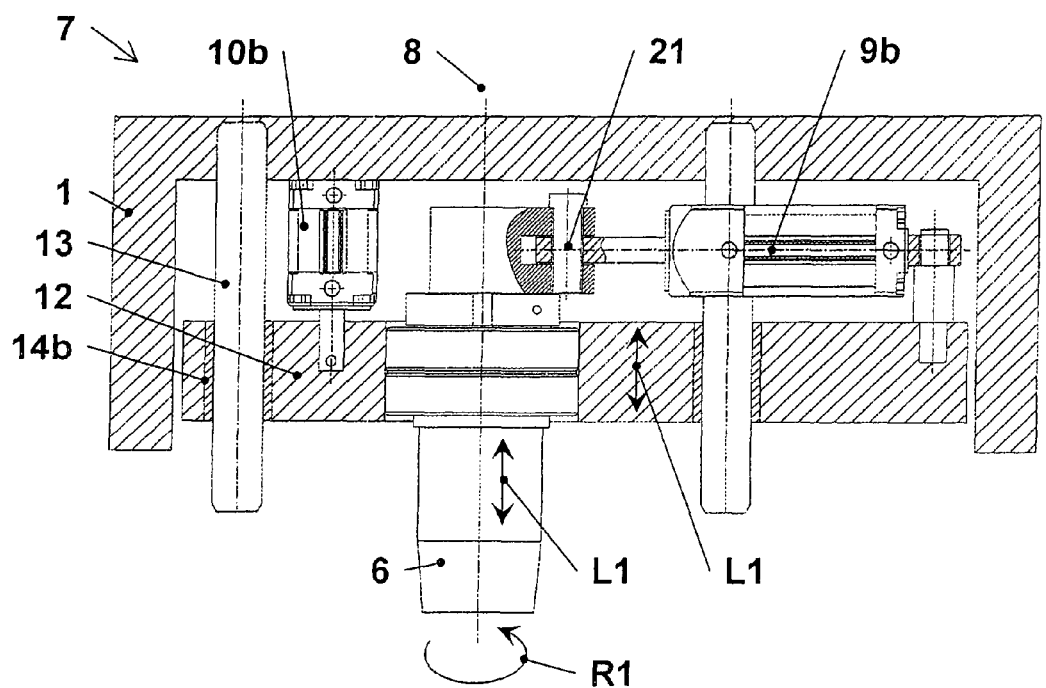
FIG. 5 shows a cross-section through the drive unit of a third alternative embodiment of the shuttle valve with an eccentric connection.

The embodiment illustrated in FIG. 5 resembles that of FIG. 4, but a different first drive is used. In this working example, the first drive is in the form of a first pneumatic drive 9b, which is formed, for example, by a high-precision pneumatic cylinder with distance regulation. The linear movement produced by the first pneumatic drive 9b is converted into a rotational movement R1 by means of the eccentric connection to the shaft 6, so that the valve disc 5 mounted on the shaft 6 via the arm 17 is pivotable parallel to the valve seat 4 as described above. The linear movement L1 is effected as in FIG. 4.

Figure 6:
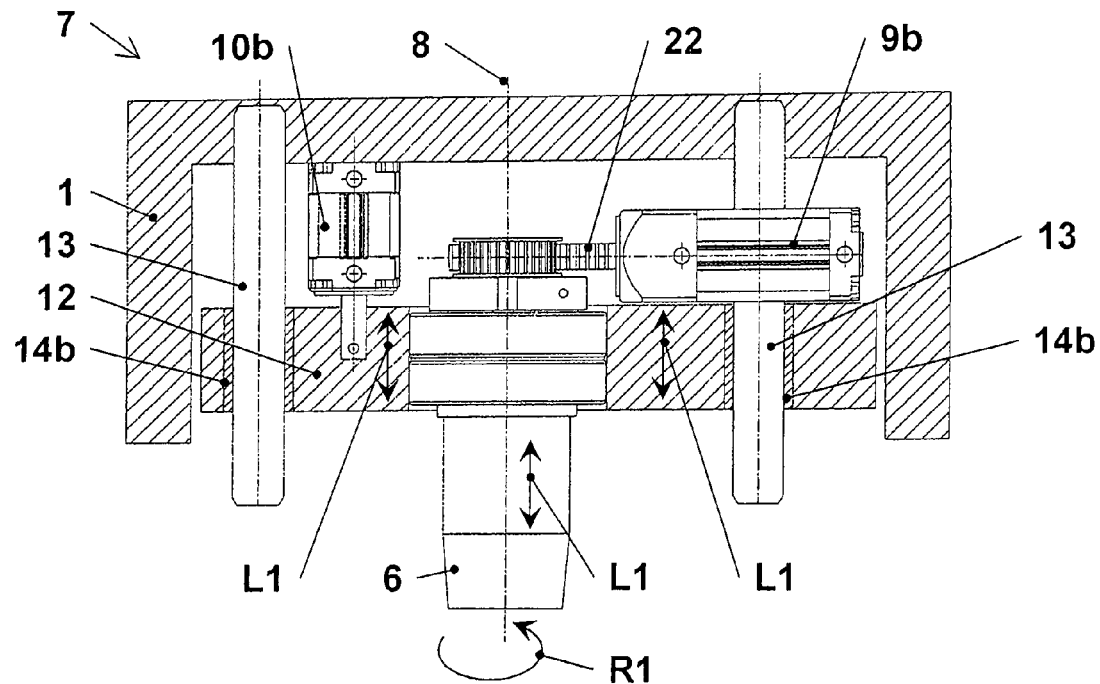
FIG. 6 shows a cross-section through the drive unit of a fourth alternative embodiment of the shuttle valve with a toothed rack connection.

FIG. 6 shows an embodiment which is also similar. The first drive for the rotational movement R1 is likewise formed here as a first pneumatic drive 9b, by means of which a linear movement on a toothed rack connection 22 is first produced. The toothed rack connection 22 produces a rotational movement R1 of the shaft 6.

Of course, it is possible to combine the drive and design variants described with one another as desired. The specific working examples explained serve merely for exemplary illustration of the invention with reference to schematic diagrams. The invention is not limited solely to these working examples.

The invention claimed is:

1. A shuttle valve for the gas-tight interruption of a flow path, comprising
    a valve housing having a wall which has an opening for the flow path and a valve seat surrounding the opening,
    a valve disc which is arranged on a rotatably mounted shaft, and
    a drive unit by means of which the valve disc can be moved along a displacement curve
        from an opened position leaving the flow path essentially unobstructed over the cross-section of the opening
        into a closed position, in which the flow path is sealed gas-tight by a sealing contact between the valve disc and the valve seat
    by swiveling the valve disc from the opened position by a rotational movement about the pivot axis of the shaft and
    by moving the valve disc by a linear movement parallel to the pivot axis in the direction of the valve seat into the closed position,
    wherein
    the drive unit has
        a first drive for carrying out the rotational movement about the pivot axis and
        a second drive for carrying out the linear movement parallel to the pivot axis,
    a control unit is provided, and
    the first drive and the second drive being actuatable by the control unit in such a way that the displacement curve can be produced, wherein the displacement curve is programmable or programmed in the control unit.

2. The shuttle valve according to claim 1, wherein the control unit is formed in such a way that the shape of the displacement curve is linked to the displacement velocity of the valve disc.

3. The shuttle valve according to claim 1, wherein the control unit is formed in such a way that the shape of the displacement curve is linked to the displacement direction of the valve disc.

4. The shuttle valve according to claim 1, comprising a slide which is mounted so as to be linearly displaceable relative to the valve housing parallel to the pivot axis and can be moved by means of the second drive for carrying out the linear movement and on which the shaft is rotatably mounted.

5. The shuttle valve according to claim 4, comprising
    at least one bearing column extending parallel to the pivot axis and
    at least one linear bearing by means of which the slide is mounted with high precision so as to be movable along the bearing column.

6. The shuttle valve according to claim 5, wherein the linear bearing is in the form of a high-precision linear roller bearing.

7. The shuttle valve according to claim 4, wherein the first drive is arranged on the slide for producing the rotational movement of the shaft.

8. The shuttle valve according to claim 4, wherein
    the first drive is decoupled from the slide and arranged on the valve housing and
    a coupling is provided between the first drive and the shaft, which coupling is arranged and formed in such a way that the axial offset between the shaft and the first drive, brought about by the linear movement of the slide, can be compensated.

9. The shuttle valve according to claim 4, wherein the second drive is in the form of a second electric motor, by means of which the slide can be moved linearly directly or indirectly for carrying out the linear movement by means of a threaded spindle.

10. The shuttle valve according to claim 4, wherein the second drive is in the form of a second pneumatic drive by means of which the slide can be moved linearly directly or indirectly for carrying out the linear movement.

11. The shuttle valve according to claim 1, wherein the first drive is in the form of a first electric motor, by means of which the shaft can be driven directly or indirectly for carrying out the rotational movement.

12. The shuttle valve according to claim 1, wherein the first drive is in the form of a first pneumatic drive by means of which the shaft can be driven directly or indirectly for carrying out the rotational movement.

13. The shuttle valve according to claim 1, wherein the second drive is in the form of a second electric motor, by means of which the shaft is axially displaceable directly or indirectly for carrying out the linear movement.

14. The shuttle valve according to claim 1, wherein the displacement curve is linked to at least one of the following variables:
- a displacement velocity of the valve disc;
- a displacement direction of the valve disc;
- a mode of operation of the shuttle valve; or
- a pressure difference at the shuttle valve;
- wherein a dependence of the displacement curve on at least one of the variables is programmable or programmed in the control unit.

15. The shuttle valve according to claim 1, wherein the displacement curve is linked to a displacement velocity of the valve disc.

16. The shuttle valve according to claim 1, wherein the displacement curve is linked to a pressure difference at the shuttle valve.

* * * * *